Oct. 15, 1968  S. MICHAELSON  3,405,460
MATHEMATICS TEACHING DEVICE
Filed May 17, 1966  2 Sheets-Sheet 1
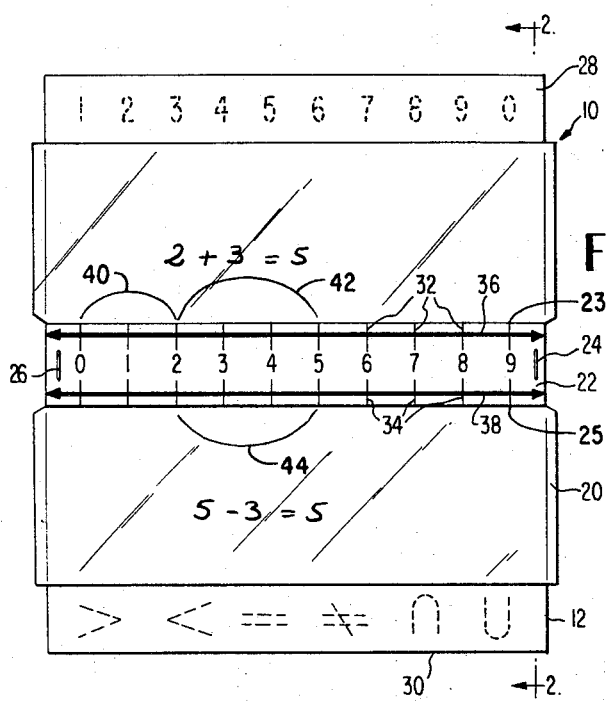
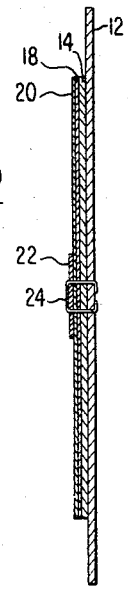
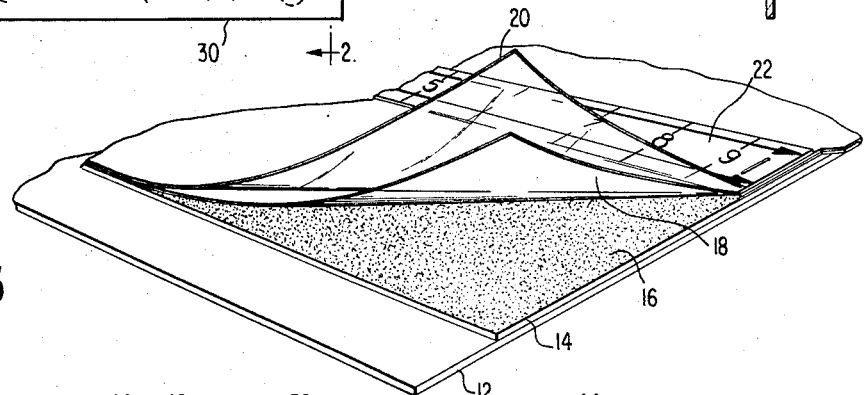
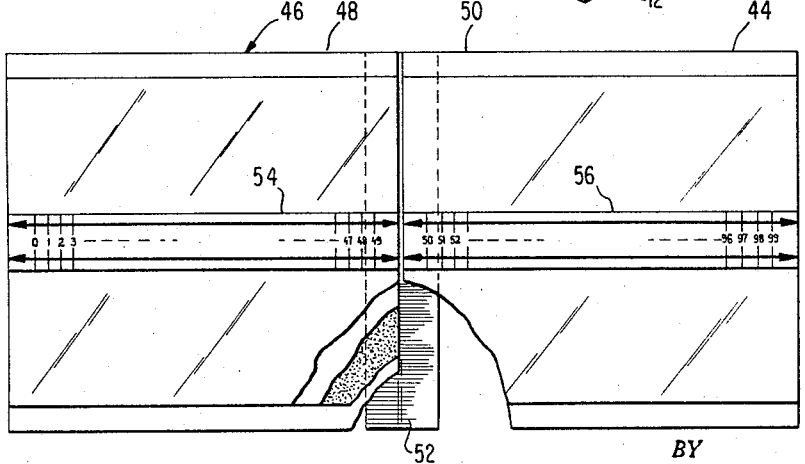
INVENTOR.
SYLVIA MICHAELSON
BY
Sughrue, Rothwell, Mion, Zinn & Macpeak
ATTORNEYS Oct. 15, 1968  S. MICHAELSON  3,405,460
MATHEMATICS TEACHING DEVICE
Filed May 17, 1966  2 Sheets-Sheet 2

INVENTOR.
SYLVIA MICHAELSON
BY
Sughrue, Rothwell, Mion, Zinn & Macpeak
ATTORNEYS.

United States Patent Office 3,405,460
Patented Oct. 15, 1968

3,405,460
MATHEMATICS TEACHING DEVICE
Sylvia Michaelson, 3402 Glen Ave.,
Baltimore, Md. 21215
Continuation-in-part of application Ser. No. 529,708,
Feb. 24, 1966. This application May 17, 1966, Ser.
No. 560,028
7 Claims. (Cl. 35—31)

ABSTRACT OF THE DISCLOSURE

A mathematics teaching device includes a number-line separating a pair of erasable surfaces, which are of the "Magic Slate" type. Sheets of the "Magic Slate" are individually pivotable at will about edges of the number-line. Different number-lines can be inserted at will by providing a transparent sleeve. A pair of devices are pivoted together, according to one embodiment.

---

The present application is a continuation-in-part of my copending, abandoned application, Ser. No. 529,708, filed Feb. 24, 1966, for "Mathematics Teaching Device."

This invention relates to an improved mathematics teaching device and, more particularly, to such a device combining a "number-line" and an easily erasable writing surface designed for use by the individual students at their desks.

In the past, the elementary school teacher has frequently had available only a large number-line which she used to demonstrate the linear approach to arithmetic problems. Such a number-line is usually mounted on the wall at the front of the classroom, and is useful when instructing the entire class or a group of students gathered at the front of the classroom. However, it is often desirable for the individual student to practice with the number-line alone at his desk while the teacher is instructing another group of students. Consequently, there is a great need for a practical and economical number-line.

Therefore, the primary object of my invention is to provide an improved mathematics teaching device which is easy to use and inexpensive to manufacture.

Another important object of my invention is to provide an improved mathematics teaching device combining a number-line and an easily erasable writing surface.

Another object is to provide a mathematics teaching device including an easily erasable writing surface and a number-line extending across the writing surface to form two writing surface portions, one above the number-line and one below the number-line, which may be used by the student in conjunction with the number-line to demonstrate and practice the linear approach to arithmetic problems.

A more specific object of my invention is to provide a mathematics teaching device for use by the individual student and including an erasable writing surface in combination with a number-line extending transversely across the center of the writing surface, thereby providing an erasable writing surface both above and below the number-line.

Another specific object is to provide a compact mathematics teaching device for use by the individual student in higher elementary grades and including two easily erasable writing surfaces hinged together and each carrying one half of a long number-line.

Another important object of the invention is to provide an improved mathematics teaching device designed for use with a plurality of different number-line strips.

The foregoing and other objects, features and advantages of the invention will be apparent from the following more particular description of preferred embodiments of the invention, as illustrated in the accompanying drawing.

FIGURE 1 is a plan view of a preferred embodiment of the invention for use at the kindergarten level;

FIGURE 2 is a cross-sectional view taken along lines 2—2 of FIGURE 1;

FIGURE 3 is a partial perspective view of the preferred embodiment of FIGURE 1;

FIGURE 4 shows another preferred embodiment of the invention for use in higher grade levels in elementary school.

Figure 5:
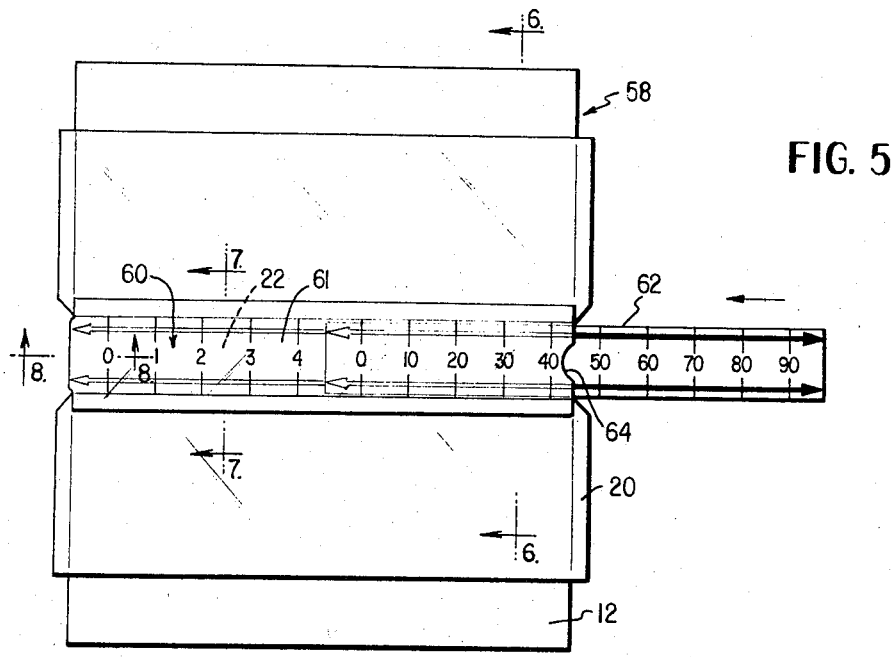
FIGURES 5 through 8 are views of still another preferred embodiment.

In FIGURES 1, 2 and 3 there is illustrated a preferred embodiment of my improved mathematics teaching device 10 for use by the individual student in the lower elementary grades. Device 10 consists of a rigid support member 12 which may be made of stiff cardboard. Glued to the top surface of support member 12 is a rigid sheet member 14 which also may be made of stiff cardboard. A black waxy material 16 is coated on the top surface of the sheet member 14. Overlying sheet member 14 and in contact with the waxy material 16 is a very thin translucent plastic sheet 18. Overlying sheet 18 is a flexible transparent plastic sheet 20. Together, sheet means 14 and 18 and the surface of waxy material 16 comprise an erasable writing surface that is divided into first and second segments.

Overlying sheet 20 and extending across the center of the mathematics teaching device 10 to divide the writing surface into first and second segments is an elongated strip 22 of plastic, paper or thin cardboard carrying indicia to form a number-line. Strip 22 divides the writing surface into a pair of segments having adjacent parallel extending edges 23 and 25. Strip 22 is secured at its ends to support member 12 and sheet member 14 by suitable fastening means such as staples 24 and 26. These staples also function to secure transparent sheet 20 and translucent sheet 18 to support member 12 and sheet member 14 in the center of the device 10, thereby leaving the upper and lower ends of sheets 18 and 20 free so that sheet 18 may be lifted by the student. Thereby, the first and second segments of the sheet means 14 and 18 are at will individually separable from waxy coating 16 by being pivotable about edges 23 and 25.

Support member 12 is made longer than the other sheet member 14 and sheets 18 and 20 to provide upper and lower extending portions 28 and 30 which provide convenient areas on which suitable mathematical numerals and symbols may be permanently printed for use by the student in practicing with this improved mathematical teaching device.

Number strip 22 carries indicia in the form of the ten decimal numerals 0, 1 . . . 8, 9 equally spaced along the length thereof. Ten graduation marks 32, extending substantially at right angles to and abutting edge 23, are formed in a line parallel to the upper edge of number strip 22. These marks are also equally spaced with each mark corresponding to a different one of the ten numerals. Each of these marks 32 is aligned with its corresponding numeral and extends to the upper edge of number strip 22. In like manner, ten equally spaced graduation marks 34 are formed in a line along the lower edge of number strip 22, substantially at right angles to and abutting edge 25. Each of the graduation marks 34 is aligned with a corresponding mark 32, at the top of strip 22. Each of the marks 34 is associated with a different one of the ten decimal numerals and extends to the lower edge of the number strip 22. Number strip 22 also carries a double headed arrow 36 spaced slightly below the upper edge of the strip and another double headed arrow 38 spaced above the lower edge of the number strip. These arrows indicate to the student that there is an infinite number of numerals both above and below those contained in the number line on strip 22.

I will now describe the manner in which a student in a lower elementary grade will use my improved mathematics teaching device in solving a simple arithmetic problem. For example, if the student were instructed to add 2 and 3, he would first draw an arc 40 of two units beginning with the upper "0" graduation mark and ending with the "2" graduation mark and then draw another arc 42 of three units from the "2" graduation mark to the upper "5" graduation mark. The student would then count the total number of units under the arcs and determine that the answer is 5.

A very important feature of my invention is that the inverse operation of any arithmetic problem may be performed while the results of the first operation are still available to the student. More specifically, if the student were instructed immediately after the above addition problem to perform the inverse operation of subtraction by subtracting 3 from 5, he would draw an arc 44 of three units beginning at the lower "5" graduation mark and ending at the lower "2" graduation mark. The student would then see that he has two units left thereby enabling him to determine that the answer is 2.

The provision of the two writing surfaces created by having the number strip 22 secured across the center of the mathematics teaching device 10 is a significant improvement. Formely, when the teacher was demonstrating the use of a number-line on the blackboard, for example, she might use a number-line in the form of a ruler having only one graduated edge. She would draw the arcs for the operation of addition, for example, and then have to superimpose the subtraction operation by the use of colored or dotted chalk lines. Such a demonstration is more difficult for younger students to visualize as compared to performing one operation on each side of the number-line of my improved teaching device so that the steps involved in any arithmetic operation and its inverse operation are clearly and simultaneously presented to the student.

Another important feature of my invention is the erasable writing surface formed by the waxy material 16, translucent sheet 18 and the transparent plastic sheet 20. The black waxy material 16 is normally invisible or only slightly visible when viewed through the translucent sheet 18 and the transparent sheet 20. However, when the student writes upon the top surface of the flexible sheet 20, the pressure caused by the pencil or other writing instrument causes the translucent sheet 18 to adhere to the waxy material 16 in the path traced by the pencil. A dark image or impression of the path of the pencil then appears on translucent sheet 18 and of course is visible through the transparent plastic sheet 20. The plastic sheet 20 is of relatively tough plastic material, and it protects the relatively fragile plastic sheet 18 which otherwise might be torn or permanently scarred by the pressure applied by the pencil. After a student has finished with a problem, he merely lifts sheet 18 from the waxy material 16 and the image or writing is automatically erased.

A second preferred embodiment of my invention is shown in FIGURE 4. Here, I have illustrated a similar mathematics teaching device 46 for use at higher grade levels in elementary school. Device 46 consists of two sections 48 and 50 each of which is substantially similar in structure to the device illustrated in FIGURES 1, 2 and 3. However, in the upper grade levels it is necessary to provide a number strip containing the hundred decimal numerals from 0 through 99. Consequently, in order to keep such a device within an easily useable size, I have hinged together the two sections 48 and 50 by means of a bookbinding strip 52 carrying a highly adhesive glue which adheres to the backsides of the two sections. When the device 46 is not in use, the two sections may be folded one upon the other. However, when the student is using the device, the two sections are opened as illustrated in FIGURE 4 so that they substantially abut each other forming essentially one large mathematics teaching device approximately eighteen inches wide. In this second embodiment, the decimal numerals "0" through "49" are inscribed on the left hand number strip 54 and the decimal numerals "50" through "99" are inscribed on the right hand number strip 56.

There are other possible variations of the basic improved teaching device. For example, the decimal numerals may be deleted from number strip 22 and, particularly when the strip is made of a synthetic plastic the student may write on the strip any desired set of numbers to coincide with graduation marks 32 and 34. The numbers may then be erased, and another set of numbers written on the strip. In another variation, a pocket with a transparent top surface is formed across the center of device 10, and several different number strips may be individually inserted in the pocket. Each strip carries a different sequence of numbers, and the student may choose the sequence suited to a particular exercise or problem. In addition, strips carrying only the graduation marks may be inserted in the pocket, and the student may write any desired set of numbers on each strip.

Figure 7:
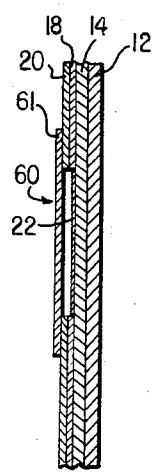
Figure 6:
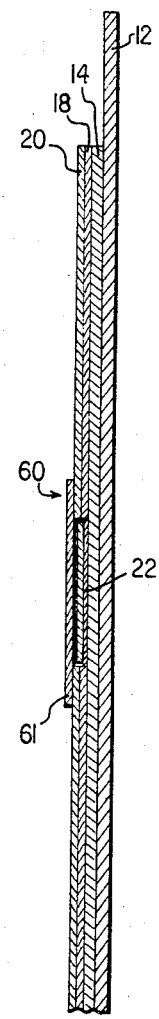
Figure 8:
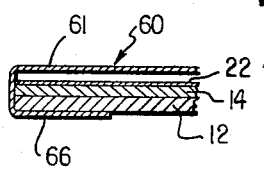

FIGURES 5–8 are various views of still another preferred embodiment of the invention. FIGURE 5 is a plan view, and FIGURES 6 through 8 are cross-sectional views taken along lines 6, 7 and 8, respectively, in FIGURE 5.

When teaching students in the lower elementary grades, one often finds it is desirable to use different number-lines having different number sequences. The improved teaching devices illustrated in FIGURES 1 through 3 and in FIGURE 4 each have a fixed number-line, i.e., one having a permanent sequence of numbers printed thereon. More specifically, FIGURE 1 shows a teaching device incorporating number-line strip 22 carrying the numbers 0, 1 . . . 9, and the teaching device illustrated in FIGURE 4 includes a number-line strip in two portions 54 and 56 carrying a number sequence 0, 1 . . . 98, 99.

The additional preferred embodiment of the invention illustrated in FIGURES 5 through 8 is an improved mathematics teaching device 58 constructed so that it may be used with several different number-line strips. Essentially, this feature is provided by means of a plastic transparent pocket or sleeve 60 placed over the permanent number-line strip 22 and secured to support member 12. The same reference numerals used in FIGURES 1–3 are used to identify corresponding parts of device 58 illustrated in FIGURES 5 through 8.

In the improved mathematics teaching device 58, translucent sheet 18 and transparent sheet 20 have been cutaway in the area of number strip 22 to form a recess which permits strip 22 to be placed directly on top of rigid sheet member 14. The plastic sleeve 60 may then be formed by securing a sheet 61 of flexible transparent plastic by an adhesive or other suitable fastening means directly to sheet 20 and over the permanent number strip 22. Sleeve 60 is of suitable size for receiving other number-line strips, such as a strip 62, which is shown in FIGURE 5 as being partially inserted in sleeve 60. Note that the replaceable number strip 62 contains a sequence of numbers 0, 10 . . . 80, 90, different from the sequence on permanent number strip 22. Sleeve 60 has formed on its right end a semicircular notch 64 to permit easy removal of replaceable number strip 62 after it has been completely inserted into sleeve 60. Note that transparent sleeve 60 may be further secured to the device 58 by folding its left end 66 under device 58 and suitably securing it to the lower surface of support member 12.

As mentioned above, any number of replaceable number strips may be used in conjunction with the improved mathematics teaching device 68. Strip 62 may be made of any opaque material carrying printed indicia representing a desired number sequence. A preferred material is an opaque plastic. One of the replaceable number-lines may be free of any numerals, thereby permitting the student to print thereon any desired number sequence. The outstanding advantage of the mathematics teaching device illustrated in FIGURES 5 through 8 is that the number of replaceable strips, such as strip 62, available to the student is unlimited.

While the invention has been particularly shown and described with reference to preferred embodiments thereof, it will be understood by those skilled in the art that various changes in form and details may be made therein without departing from the spirit and scope of the invention.

What is claimed is:

1. A device for enabling a student to learn mathematical concepts comprising an erasable writing surface means divided into first and second segments, said first and second segments having adjacent, parallel extending edges, an elongated number-line positioned between said segments, said number-line including first and second sets of indicia substantially abutting said edges of said first and second segments, respectively, said sets of indicia including equispaced marks extending at right angles to said edges, the marks of said first set of indicia being aligned with corresponding marks of said second set of indicia, said erasable writing surface means including: a base having a dark waxy coating, and thin flexible plastic sheet means overlaying said base member in contact with said coating, said sheet means being divided into first and second segments, one of each of said sheet means segments being provided for each of said writing surface segments, said first and second sheet means segments being individually separable at will from the dark waxy coating.

2. The device of claim 1 wherein said first and second sheet means are secured to a carrier for said number-line and are individually pivotable at will about the edges of said first and second writing surface segments, respectively.

3. The device of claim 2 wherein said thin flexible plastic sheet means comprises: a thin translucent plastic sheet overlying said base member in contact with said waxy coating, and a flexible transparent plastic sheet overlying said translucent sheet; whereby pressure produced by a writing instrument applied to said transparent sheet causes said translucent sheet to adhere to the waxy surface in the path produced by the writing instrument to form on said translucent sheet a dark visible image defined by the path of the instrument.

4. The device of claim 2 wherein said carrier comprises a transparent plastic sleeve covering said number-line, said sleeve including an opening in at least one edge thereof for enabling different number-line strips to be inserted therein.

5. The device of claim 2 further including a second erasable writing surface means divided into third and fourth segments, said third and fourth segments having adjacent, parallel extending edges, a second elongated number-line positioned between asid third and fourth segments, said second number-line including third and fourth sets of indicia substantially abutting said edges of said third and fourth segments, respectively, said sets of third and fourth indicia including equally spaced marks extending substantially at right angles to said third and fourth edges, the marks of said third set of indicia being aligned with corresponding marks of said fourth set of indicia, said second erasable writing surface means including: a second base having a second dark waxy coating, and second thin flexible sheet means overlaying said base member in contact with said coating, said second sheet means being divided into third and fourth segments, one each of said third and fourth sheet means segments being provided for each of said third and fourth writing surface segments, said third and fourth sheet means segments being individually separable at will from the dark waxy coating, said third and fourth sheet means being secured to a second carrier for said second number-line and individually pivotable at will about the edges of said third and fourth writing surface segments, respectively, means for hinging together both of said writing surfaces and both of said number-lines so that both of said number-lines are in alignment, said hinging means enabling said writing surfaces and number-lines to be closed so that they fold upon each other and opened so that corresponding edges of the writing surfaces and number lines substantially abut.

6. The device of claim 1 further including a second erasable writing surface means divided into third and fourth segments, said third and fourth segments having adjacent, parallel extending edges, a second elongated number-line positioned between said third and fourth segments, said second number-line including third and fourth sets of indicia substantially abutting said edges of said third and fourth segments, respectively, said sets of third and fourth indicia including equally spaced marks extending substantially at right angles to said third and fourth edges, the marks of said third set of indicia being aligned with corresponding marks of said fourth set of indicia, said second erasable writing surface means including: a second base having a second dark waxy coating, and second thin flexible sheet means overlaying said base member in contact with said coating, said second sheet means being divided into third and fourth segments, one each of said third and fourth sheet means segments being provided for each of said third and fourth writing surface segments, said third and fourth sheet means segments being individually separable at will from the dark waxy coating, means for hinging together both of said writing surfaces and both of said number-lines so that both of said number-lines are in alignment, said hinging means enabling said writing surfaces and number-lines to be closed so that they fold upon each other and opened so that corresponding edges of the writing surfaces and number-lines substantially abut.

7. The device of claim 1 further comprising a transparent sleeve covering said number-line, said sleeve having an opening in at least one edge thereof to enable different elongated number-line strips to be inserted therein.

References Cited

UNITED STATES PATENTS

| | | | |
|---|---|---|---|
| 1,455,579 | 5/1923 | Evans | 35—66 |
| 1,678,621 | 7/1928 | Holmes | 35—75 XR |
| 2,137,736 | 11/1938 | Watkins. | |
| 3,353,284 | 11/1967 | Hursh et al. | 35—31 |

FOREIGN PATENTS 579,560  8/1924  France.

EUGENE R. CAPOZIO, *Primary Examiner.*

W. GRIEB, *Assistant Examiner.*